APPARATUS FOR CONTINUOUSLY ELECTROPLATING A METALLIC STRIP

Filed Feb. 11, 1966 5 Sheets-Sheet 1

INVENTOR.
DANIEL T. CARTER
By Donald G. Dalton
Attorney

APPARATUS FOR CONTINUOUSLY ELECTROPLATING A METALLIC STRIP
Filed Feb. 11, 1966
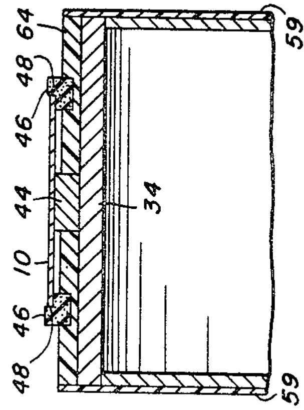
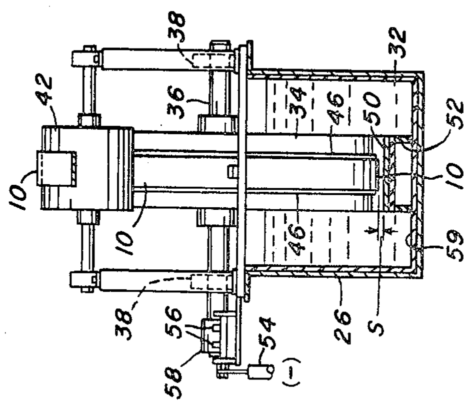
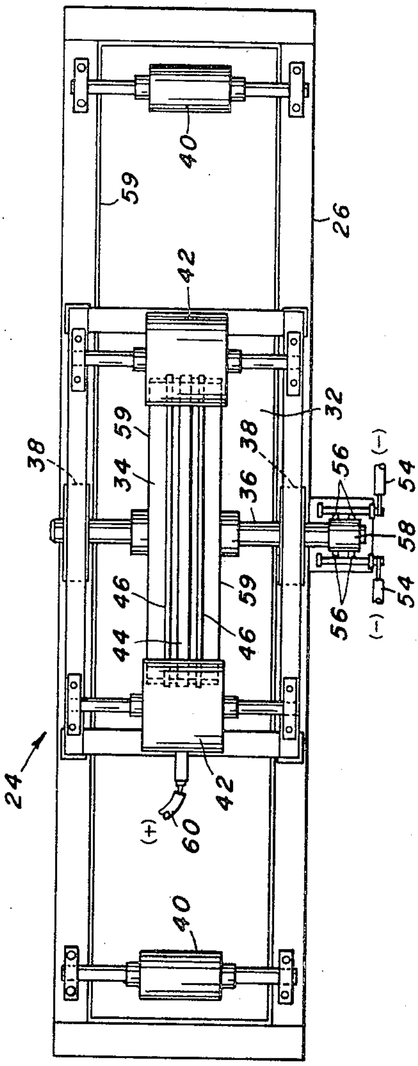
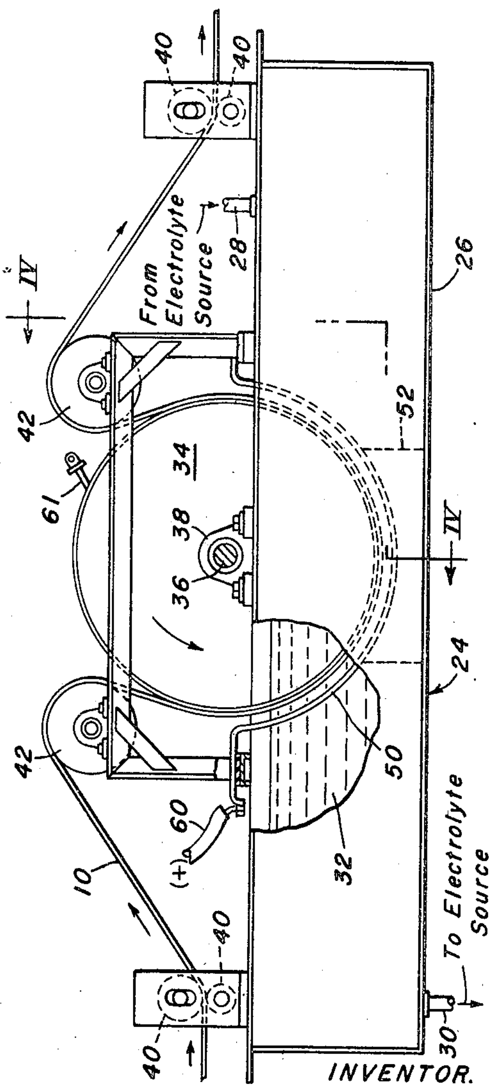
INVENTOR.
DANIEL T. CARTER
By Donald G. Dalton
Attorney Dec. 9, 1969 D. T. CARTER 3,483,113

APPARATUS FOR CONTINUOUSLY ELECTROPLATING A METALLIC STRIP

Filed Feb. 11, 1966 5 Sheets-Sheet 3

INVENTOR.
DANIEL T. CARTER
By Donald G. Dalton
Attorney

APPARATUS FOR CONTINUOUSLY ELECTROPLATING A METALLIC STRIP

Filed Feb. 11, 1966 5 Sheets-Sheet 4

INVENTOR.
DANIEL T. CARTER
By Donald G. Dalton
Attorney

INVENTOR.
DANIEL T. CARTER
By Donald G. Dalton
Attorney

United States Patent Office 3,483,113

Patented Dec. 9, 1969

3,483,113
APPARATUS FOR CONTINUOUSLY ELECTROPLATING A METALLIC STRIP

Daniel T. Carter, Penn Township, Westmoreland County, Pa., assignor to United States Steel Corporation, a corporation of Delaware Filed Feb. 11, 1966, Ser. No. 526,730
Int. Cl. C23b *5/68, 5/58;* B01k *3/00*
U.S. Cl. 204—206 22 Claims

ABSTRACT OF THE DISCLOSURE

This invention relates to electroplating of a metallic strip and, more particularly, to an improved method and apparatus for continuously electroplating one side of a metallic strip. The rotary-type plating apparatus for electroplating a metal onto a moving sheet under tension and has tank means adapted to contain an electrolyte, rotatable member rotatable in the electrolyte for guiding the sheet along its path of movement through said electrolyte, a contact member on the periphery of the rotatable member and engageable with the sheet during its path of movement through the electrolyte to make electrical contact therewith, sealing means adjacent the contact member on said rotatable member for sealing one surface of the sheet from the electrolyte, anode means in the electrolyte adjacent the rotatable member, power means connected to the sheet as cathode and to the anode means, and electrolyte sealing means between the rotatable member and the tank means for confining the electrolyte therebetween.

BACKGROUND OF THE INVENTION

Heretofore, conventional methods and apparatus for electroplating metallic strip and the like have been of the type shown in the following United States patents: 570,125, J. B. Forsyth et al., Oct. 27, 1896; 1,437,003, J. J. Mueller, Nov. 28, 1922; 1,819,130, J. A. Smith, Aug. 18, 1931; 2,509,304, C. J. Klein, May 30, 1950; 2,569,577, H. J. Reading, Oct. 2, 1951; Re. 23,456, E. W. Rieger, Jan. 22, 1952; 2,844,529, A. Cybriwsky et al., July 22, 1958; 2,989,445, A. J. Lloyd, June 20, 1961.

Referring to such conventional methods and apparatus, U.S. Patent No. 570,125 has insulating bars projecting from a cathode shell and defining a deposition space for material to be deposited therebetween. The metal strip of U.S. Patent No. 1,437,003 passes adjacent the anode plates and the metal is deposited on this adjacent side of the strip. U.S. Patent No. 1,819,130 plates either two side-by-side sheets on one side only or utilizes a traveling insulating cover on the single sheet to plate only on one side of the single sheet. The electrolyte pans of U.S. Patent No. 2,509,304 are disposed at different elevations to permit electrolyte flow by gravity from adjacent pans thereby simplifying electrolyte supply apparatus and saving electrolyte. The apparatus of U.S. Patent No. 2,569,577 maintains the strip near the surface of the electrolyte thus plating only one side and provides uniform coating density by adding electrolyte to the strip in the center of the electroplating tank. The resilient bridging member and dam mechanism of Reissue Patent No. Re. 23,456 saves electrolyte, reduces the pumping rate and prevents aeration of the electrolyte. The method of U.S. Patent No. 2,844,529 coats a strip on one side or both sides utilizing a temperature differential between the sheet anode and the electrolyte. U.S. Patent No. 2,989,445 utilizes an arcuate conductor for supporting the sheet in the electroplating weir box and for flowing electrolyte to coat metal only on the surface of the sheet.

These conventional methods and apparatus are complicated and expensive to build and maintain, and are not able to plate relatively thin gage strip. Further, such conventional methods and apparatus require large amounts of floor space. In addition, the twisting or sagging of the sheet being plated permits non-uniform cathode-to-anode spacing. Again, it is not possible to coat one or both sides of a strip with one or more metals of varying plating thickness of different coating weights of the same or different materials. Poor electrical contact between the strip and the plating power source and discontinuous electric contact with the strip over the entire effective plating length causes poor cathode current distribution and difficulties in the plating of poor electrical conductor materials, such as stainless steel. Further, the non-uniform current distribution is high at the entrance and exit to the plating tank and low in the middle of the plating tank.

Conventional electroplating methods and apparatus utilizing the contact or conductor rolls to energize the strip or sheet require large amounts of power, such as for example 18 volts to provide 400 amperes per square foot. In addition, the sliding of the contact rolls over the sheet scratches or dents the sheet. Also the acid in the electrolyte attacks the unplated side of the sheet. It is necessary in the modern industrial world to provide metallic strip which has been plated on one side only, such as in the case of steel strip which strip is zinc coated on one side only for use in the automotive industry.

OBJECTS OF THE INVENTION

It is the general object of the present invention to avoid and overcome the foregoing and other difficulties of and objections to prior art practices by the provision of an improved method and apparatus for continuously electroplating one side of a metallic sheet or strip, which improved method and apparatus:

(1) Provide constant positive electrical contact by strip tension;

(2) Continuous electrical contact of the strip with the power source over the entire plating length thereby minimizing variations in the cathode current distribution and voltage losses in the plating circuit and facilitating the electroplating of certain materials which are poor electricale conductors, such as stainless steel;

(3) Eliminate twisting and sagging of the strip being coated thereby assuring constant and closer cathode-anode spacing and lower power requirements for the same plating current density;

(4) Eliminate rolling and sliding contact and resultant scratching of the strip surface;

(5) Utilize smaller floor space requirements than conventional apparatus;

(6) Permit the electroplating of one or both sides of the continuous strip with one or more metals of varying plating thickness;

(7) Facilitate the electroplating of relatively thin gage strip;

(8) Are simple and inexpensive to build and to maintain;

(9) Minimize chemical attack on the unplated surface of the sheet;

(10) Provide maximum effective plating length;

(11) Provide a continuous flow of efficient electrolyte through the apparatus; and

(12) Provide a rotatable member adaptable to receive a wide range of sizes of the sheet.

BRIEF SUMMARY OF THE INVENTION

The aforesaid objects of the present invention, and other objects which will become apparent as the description proceeds, are achieved by providing an improved rotary-type plating apparatus for electroplating a material onto a moving sheet under tension and having a tank means adapted to contain an electrolyte. A rotatable member is rotatable in the electrolyte for guiding the sheet along its path of movement through the electrolyte. A contact member is disposed on the periphery of the rotatable member and is engageable with the sheet during its path of movement through the electrolyte. Sealing means are on the rotatable member adjacent the contact member for sealing one surface of the sheet from the electrolyte. Anode means are disposed in the electrolyte adjacent the rotatable member, and power means are connected to the sheet which functions as cathode and to the anode means. Circulating means adjacent the sheet provide improved plating efficiency. A reel-type rotating member accommodates a wide range of sizes of the sheet.

BRIEF DESCRIPTION OF THE SEVERAL VIEWS OF THE DRAWINGS

For a better understanding of the present invention reference should be had to the accompanying drawings, wherein like numerals of reference indicate similar parts throughout the several views and wherein:

FIG. 2 is an enlarged side elevational view of the electroplating apparatus of the invention shown in FIGURE 1;

FIGURE 3 is a plan view of the electroplating apparatus of the invention shown in FIGURE 2 with the moving sheet eliminated therefrom for clarity;

FIGURE 4 is a vertical sectional view of the electroplating apparatus shown in FIGURE 2 taken along the line IV—IV of FIGURE 2 in the direction of the arrows;

FIGURE 5 is an enlarged fragmentary vertical sectional view of the contact ring and sealing means assembly;

Although the principles of the present invention are broadly applicable to the electroplating of a moving sheet on one or both sides, the present invention is particularly adapted for use in conjunction with the electroplating of a moving sheet on one side and hence it has been so illustrated and will be so described.

DETAILED DESCRIPTION

Figure 1:
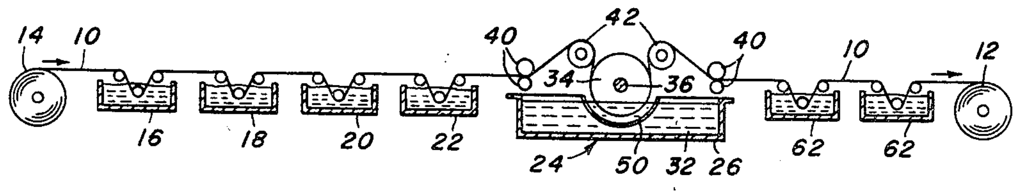
FIGURE 1 is a diagrammatic side elevational view of an electroplating line incorporating the electroplating apparatus of the invention.

With specific reference to the form of the present invention illustrated in the drawings, and referring particularly to FIGURES 1, 2 and 5, a moving sheet or strip, such as a cold-rolled carbon steel sheet, is indicated generally by the reference numeral 10.

This strip 10 (FIGURE 1) is moved by a variable speed take-up reel 12 from a pay-off reel 14 and successively through an electrolytic cleaning tank 16 (employing an alkaline electrolytic cleaner of the type similar to MG102, the trade name of a cleaner manufactured by Mangill Chemical Company, Cleveland, Ohio), a hot water rinse tank 18, a sulfuric acid tank 20, and a hot water rinse tank 22 to the electroplating apparatus 24 of this invention.

Referring to FIGURES 2–5 the electroplating apparatus 24 for electroplating a material, such as zinc, on the strip 10 tank means, such as the electrically-insulated tank 26 (FIGURES 2–4). This tank 26 has an inlet 28 (FIGURE 2) and oulet 30 for an electrolyte 32 (FIGURES 2–4), which the tank 26 is adapted to contain. A suitable electrolyte 32 at a temperature of about 115° F. may contain about 10 ounces per gallon of zinc ions, about 12 ounces per gallon of sulphuric acid and the balance water. A rotatable member, such as a drum 34 (FIGURES 1–5), is mounted on a shaft 36 (FIGURES 1–5) journaled in bearings 38 (FIGURES 2–4) on the tank 26. The sheet 10 is passed around rolls 40, 42 (FIGURES 1–3) from the hot water rinse tank 22 to the drum 34. For the purpose of causing the sheet 10 to function as a cathode, a contact member, such as the contact ring 44 (FIGURES 3, 5), suitably nickel or the like, on the periphery of the drum 34 engages the sheet 10. As shown in FIGURES 3–5 and in FIGURE 5 particularly, sealing means, such as the resilient sealing bands 46 formed of polyethylene or the like, are mounted adjacent the contact ring 44 and engage the sheet 10 for sealing one side of the sheet 10 from the electrolyte 32. The sealing bands 46 are mounted in an insulating hard covering 64 (FIGURE 5), suitably polyvinyl chloride or the like. Such contact ring 44 and sealing bands 46 form a contact and sealing means assembly.

As such sheet 10 is pulled into intimate electrical engagement with the contact ring 44, the tension on the sheet 10 depresses the resilient sealing bands 46 and such sheet 10 is sealed at its edges 48 by the sealing bands 46 (FIGURE 5). The edges 48 of the sheet 10 press in on the sealing bands 46 and the back tension on the sheet 10 causes the sealing bands 46 to collapse thereby forming a seal at the edges 48 of the sheet 10.

Anode means, such as the anode 50 (FIGURES 1, 2, 4) suitably formed of about 99.5% lead and the balance silver and mounted on anode supports 52 (FIGURES 2, 4) in the tank 26, are disposed adjacent the sheet 10 on the drum 34. Power means, such as negative cables 54 (FIGURES 3, 4), brushes 56 (FIGURES 3, 4) and slip rings 58, connect the drum 34 and the sheet 10 negatively to the D-C supply (not shown), while cables 60 (FIGURES 2, 3) connect the positive side of the D-C supply to the anode 50. Wiper means, such as the wiper 61 (FIGURE 2), contact the peripheral surface of the drum 34 at a location outside of the electrolyte 32, thus minimizing chemical attack on the unplated surface of the sheet 10. The applied negative D-C voltage is about 5.0 to 6.0 volts and flows from the D-C source (not shown) through negative cables 54 (FIGURES 2, 4), brushes 56, slip rings 58, shaft 36, drum 34, contact ring 44 to the sheet 10. All surfaces except the contact ring 44 and sealing bands 46 are electrically insulated with an insulating material 59 (FIGURES 3, 4, 5), such as polyvinyl chloride or the like. The hard backing, such as polyvinyl chloride 64, backs up the sealing bands 46.

After the plated sheet 10 leaves the electroplating apparatus 24 via rolls 42, 40, such sheet 10 passes through hot rinse tanks 62 (FIGURE 1) and is wound upon the take-up reel 12.

In one test, steel sheet 10 was electrogalvanized at current densities of 100 to 685 amperes per square foot with ¾ inch spacing S (FIGURE 4) between the anode 50 and cathode sheet 10 thus yielding coating thicknesses of 2 to 65 x $10^{-5}$ inches. At 685 amperes per square foot, the zinc plating efficiency was 95 percent. The coatings were light colored, smooth, adherent and ductile. In another test, the anode-to-cathode spacing S (FIGURE 4) was reduced to ½ inch and the current density increased to 1050 amperes per square foot. At this higher current density, the deposit was unchanged and there was no "treeing" or excess zinc buildup at the edges of the galvanized sheet 10. Again, there was no deposited zinc or defects of any kind on the unplated surface of the galvanized sheet 10.

Further, buffed 430 Mo stainless steel sheet 10 was chromium plated in a chromium plating electrolyte 32 having about 20 ounces per gallon chromic acid, about 0.8 ounce per gallon of an alkali additive, such as Diamond CPA 1800, the trade name of an additive manufactured by Diamond Alkali Company, Cleveland, Ohio, about 0.08 ounce per gallon of sulphuric acid at a temperature of about 135° F. and with an anode 50 about 7% antimony lead. At current densities ranging from 110 to 617 amperes per square foot and at ¾ inch spacing S (FIGURE 4) between the anode 50 and cathode (sheet 10), adherent, mirror-like finishes resulted with thicknesses ranging from 25 to 24 x $10^{-6}$ inches. There was no evidence of plating on the back side of the stainless steel sheet 10 or on the contact ring 44. Both surfaces of the stainless steel sheet 10 were free of stains, electrical contact marks or scratches.

With the improved electroplating apparatus 24 anode-to- cathode spacings S (FIGURE 4) less than ⅛ inch can be used thereby increasing the current density to about 1500 amperes per square foot.

Alternative embodiments

Figure 6:
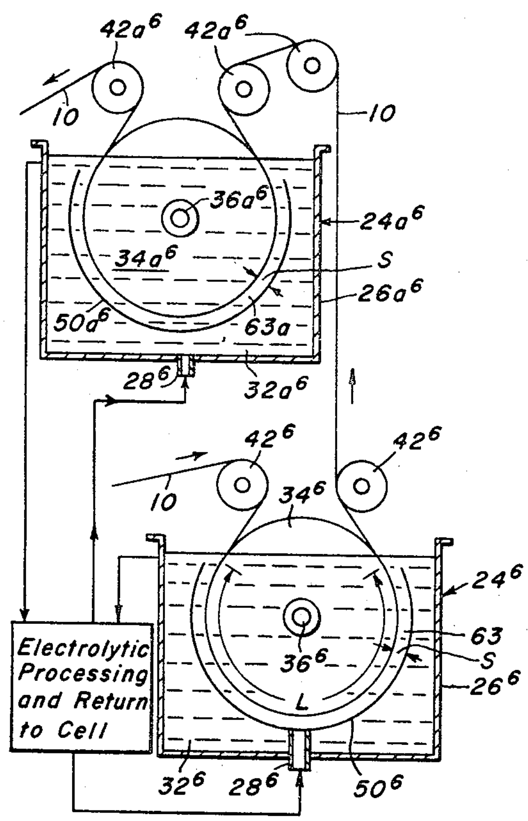
FIGURE 6 is a diagrammatic view of an alternative embodiment of the electroplating apparatus and showing two electroplating stages thus permitting the plating of the sheet on both sides.

It will be understood by those skilled in the art that alternatively, as shown in FIGURE 6, the drum 34$^6$ is mounted at 36$^6$ substantially within the tank 26$^6$ and the non-conducting guide rolls 42$^6$ are disposed close together to provide an effective plating length L of about 330° of the periphery of the drum 34$^6$. The plated sheet 10 is then fed to a second stage electroplating apparatus 24$^6$*a* where the uncoated side of the sheet 10 is coated either with the same material, such as zinc, but with a different thickness or such sheet 10 may be coated with a different material, such as chromium. For the purpose of improving the circulation of the electrolyte 32$^6$ in a cavity 63 between the sheet 10 and the anode 50$^6$, and inlet 28$^6$ is provided in the tank 26$^6$ and in the anode 50$^6$.

Figure 8:
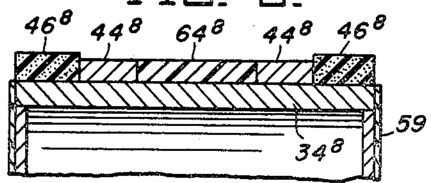
FIGURES 7–10 are fragmentary vertical sectional views of alternative embodiments of the contact ring and sealing means assembly, wherein the moving sheet is omitted for clarity.
Figure 9:
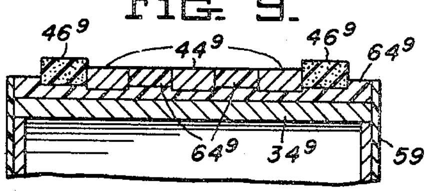
Figure 10:
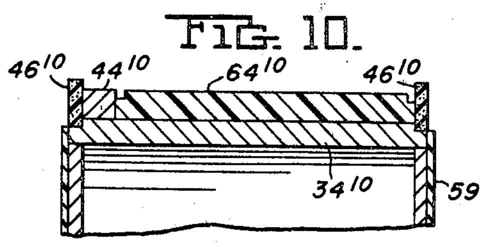
Figure 7:
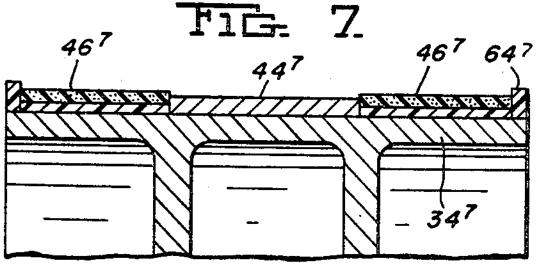
Figure 11:
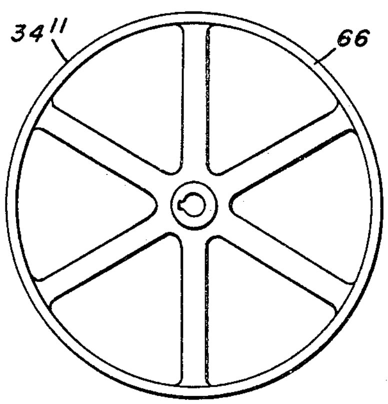
FIGURE 11 is a side elevational view of an alternative embodiment of a rotating member.

In FIGURE 7 a single contact ring 44$^7$ is employed with adjacent sealing bands 46$^7$ to provide adaptability for a wide range of sizes of the sheet 10. The sponge-like sealing bands 46$^7$ are backed by a hard covering 64, such as polyvinyl chloride or the like, on the drum 34$^7$. Improved current density may be provided by use of the dual contact rings 44$^8$ with two sealing bands 46$^8$ (FIGURE 8) or the three contact rings 44$^9$ and four sealing bands 46$^9$ (FIGURE 9). In FIGURE 10 the outside contact ring 44$^{10}$ and sealing strip 46$^{10}$ are employed on one side in this case, the left side, with a sealing strip 46$^{10}$ and back-up member 64$^{10}$ on the other side. The rotatable member 34$^{11}$ shown in the FIGURE 11 is a spoked wheel formed of a light metal, such as aluminum, to provide decreased mass and increased current carrying capacity. It is coated with a corrosion resistant material 66, such as polyvinyl chloride or the like.

Figure 12:
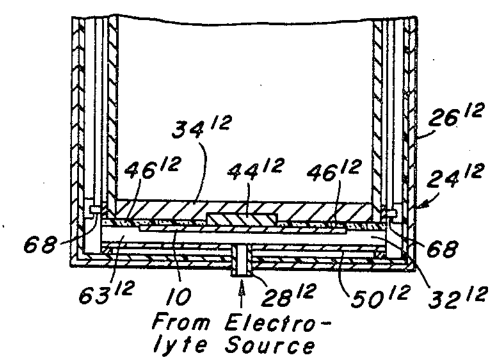
FIGURE 12 is a fragmentary vertical sectional view similar to FIGURE 4 of an alternative embodiment having a sealing means between the drum and tank for improving the flow of fresh electrolyte.
Figure 13:
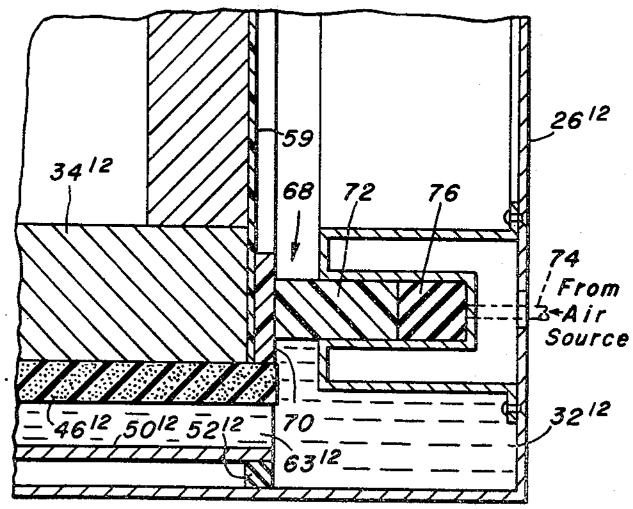
FIGURE 13 is an enlarged fragmentary view of the sealing means of FIGURE 12.

To further improve circulation in the cavity 63 between the drum 34$^{12}$, the tank 26$^{12}$ and the anode 50$^{12}$, an electrolyte sealing means 68 (FIGURES 12, 13) is employed. This electrolyte sealing means 68 has an annular disc 70 (FIGURE 13) on the drum 34$^{12}$ (which disc 70 is engageable by a biased ring 72) to confine circulation by inlet pipe 28$^{12}$ to the cavity 63$^{12}$. The disc 70 and ring 72 may be polypropylene and Teflon respectively. The biasing means for the ring 72 is, as shown in FIGURE 13, either compressed air through line 74 or a spongy insert 76, suitably rubber. It is understood that the ring 72 may be on either the tank 26$^{12}$ or the drum 34$^{12}$; that the disc 70 on the other, and that the biasing means may be associated with either the disc 70 or the ring 72.

Figure 14:
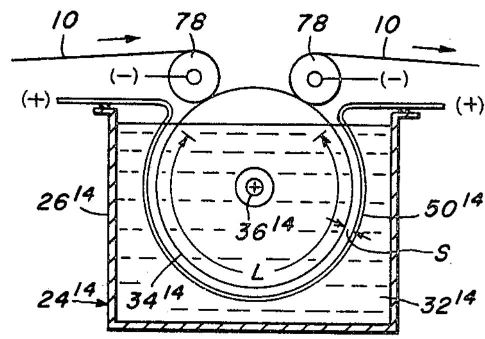
FIGURE 14 is a view similar to FIGURE 6 of an alternative embodiment utilizing contact rolls and having a maximum effective plating length.
Figure 15:
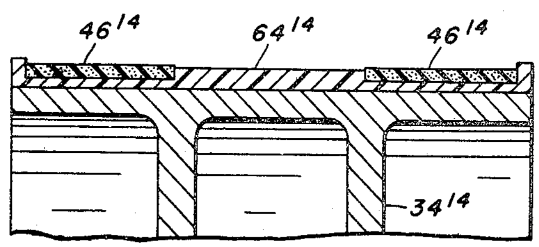
FIGURE 15 is a fragmentary vertical sectional view similar to FIGURE 7 of the rotatable member shown in FIGURE 14.

In the embodiment of FIGURES 14, 15, contact rolls 78 are employed as the cathode source of voltage and are disposed to provide maximum effective plating length L on the drum 34$^{14}$. The contact ring is omitted and the sealing bands 46$^{14}$ (FIGURE 15) seal the sheet 10 as before.

Figure 16:
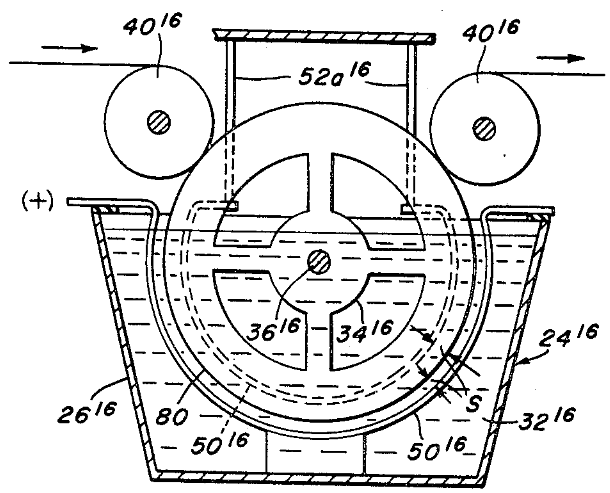
FIGURE 16 is a view similar to FIGURE 14 showing an alternative embodiment of the electroplating apparatus for plating both sides of the sheet.
Figure 17:
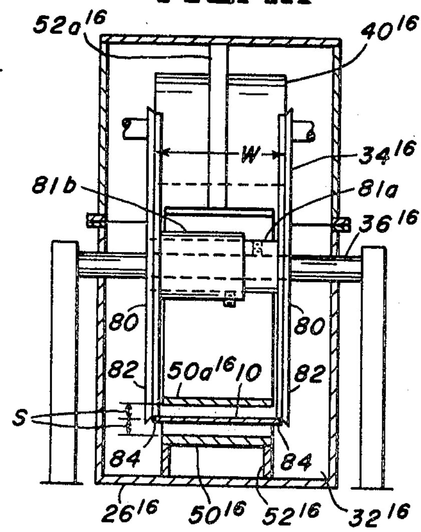
FIGURE 17 is a view similar to FIGURE 4 of the electroplating apparatus shown in FIGURE 16.

In FIGURES 16, 17, the rotatable member 34$^{16}$ is a reel-like member having a pair of opposed wheels 80, the hubs 81*a*, 81*b*, of which wheels 80 adjustably telescope within each other to accommodate a variable sheet width W. Each wheel 80 has a guide flange 82 and a contact rail 84. A pair of replaceable anodes 50$^{16}$ are disposed one on each side of the sheet 10 to simultaneously electroplate both sides of such sheet 10. The contact rails 84 serve the same function as the contact ring 44 (FIGURES 1–5), etc. and also support the sheet 10.

Figure 18:
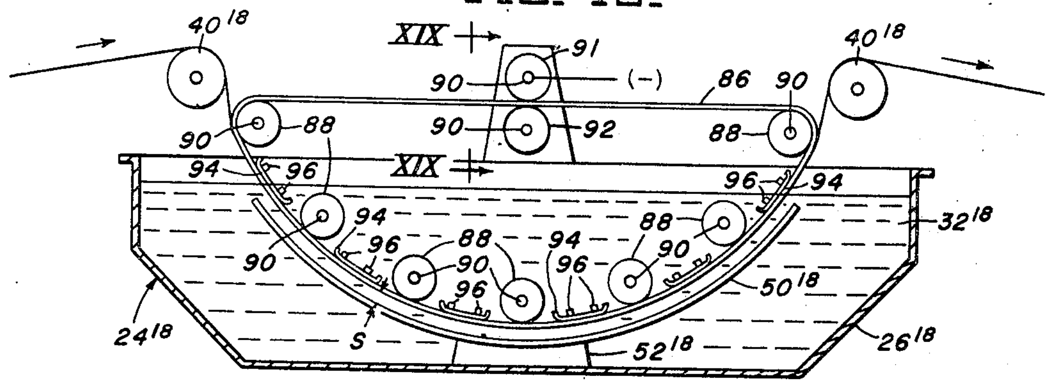
FIGURE 18 is a side elevational view of an alternative conveyor-type apparatus.
Figure 19:
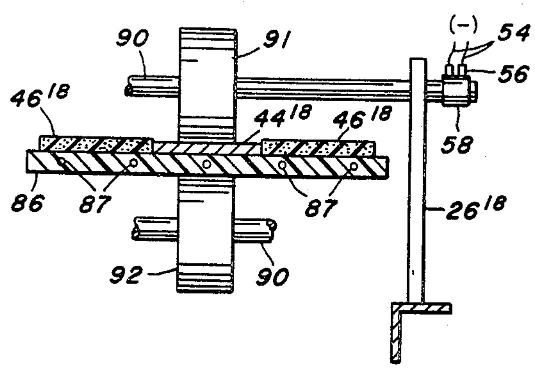
FIGURE 19 is a vertical sectional view taken along the line XIX—XIX of FIGURE 18 in the direction of the arrows.

Referring now to FIGURES 18, 19, the rotatable member is a conveyor belt 86, suitably polyvinyl chloride plastic or the like, cable reinforced at 87 and mounted on rolls 88, which rolls 88 are positioned on shafts 90 journaled in the side walls of the tank 26$^{18}$. The contact member is a continuous contact band 44$^{18}$ (FIGURE 18) and the sealing means are the sealing bands 46$^{18}$. Cathode contact with the contact band 44$^{18}$ is made by means of a conductor roll 91 (FIGURE 18) and a back-up roll 92. Guides 94 (FIGURE 14) mounted on supports 96 in the side walls of the tank 26$^{18}$ maintain constant anode-to-cathode spacing S. The belt 86 may be replaced by a link-type conveyor formed of a corrosion resistant material, such as Teflon.

Method

It will be understood from the above description of the electroplating apparatus 24 (FIGURES 1–5) and 24$^6$, 24$^6$*a* (FIGURE 6), 24$^{12}$ (FIGURES 12, 13), 24$^{14}$ (FIGURES 14, 15), 24$^{16}$ (FIGURES 16, 17), 24$^{18}$ (FIGURES 18, 19) that an improved method is contemplated by this invention.

This improved method of electroplating a material, such as zinc, on a moving sheet of for example steel comprises the steps of:

(a) Guiding the sheet 10 onto a rotatable member 34 (FIGURES 1–5), etc. and into contact with a contact means 44 (FIGURES 1–5), etc.;

(b) Sealing the sheet 10 at 46 (FIGURES 1–5), etc. to the rotatable member 34 (FIGURES 1–5), etc.;

(c) Moving the sheet 10 and the rotatable member 34 (FIGURES 1–5), etc. through an electrolyte 32 and adjacent to an anode means 50 (FIGURES 1–5), etc.;

(d) Circulating the electrolyte 32 (FIGURES 1–5) adjacent the sheet 10; and (e) Electroplating the material (zinc, etc.) on the sheet 10.

It will be recognized by those skilled in the art that the objects of the present invention have been achieved by providing an improved electroplating apparatus 24

(FIGURES 1–5) $24^6$, $24a^6$ (FIGURE 6) etc., which provides positive and continuous electrical contact between the cathode (sheet 10) and the contact ring 44 over the entire plating length L (FIGURE 6), thus minimizing variations in the cathode current distribution and voltage losses and facilitating the electroplating of poor electrical conductor materials, such as stainless steel and thin gage sheet. Since the sheet 10 moves on drum 34, the substantial elimination of conventional contact rolls 78 (FIGURE 14) also eliminates rolling and sliding contact between the contact rolls 78 and the sheet 10, thus eliminating scratching of the sheet 10. The full support of the sheet 10 by the drum 34 along the effective plating length L (FIGURE 6) eliminates twisting and sagging of the sheet 10. Use of the drum 34 reduces the space requirements for the improved electroplating apparatus 24 (FIGURES 1–5), etc., over those of conventional apparatus. The apparatus 24 (FIGURES 1–5), etc., permits electroplating of one or both sides of the sheet 10 with one or more metals of varying plating thickness. The use of the wiper 61 and the sealing strips 46 minimizes chemical attack on the unplated surface of the sheet 10. The apparatus 24 (FIGURES 1–5), etc., is simple and rugged in structure and inexpensive to build and to maintain. Such apparatus 24 (FIGURES 1–5), etc., when compared with conventional apparatus reduces power requirements by ⅓, increases current density by a factor of 2 and provides long effective plating lengths L (FIGURE 6). Use of this apparatus provides maximum effective plating length and circulation of the electrolyte adjacent the sheet 10 maintains fresh electrolyte in contact with the sheet 10. The reel-type drum 34 (FIGURE 17) accommodates a wide range of sizes of the sheet 10.

Figure 20:
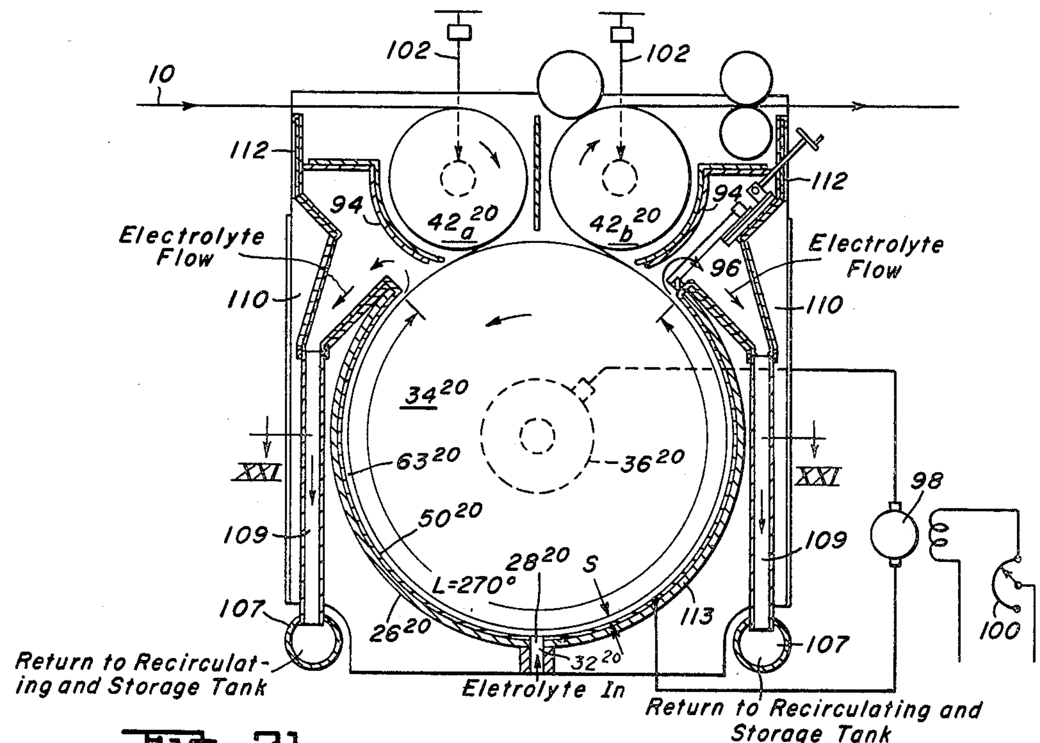
FIGURE 20 is a side elevational view, partially diagrammatic, of a further alternative embodiment showing maximum effective anode length and electrolyte flow control means.
Figure 21:
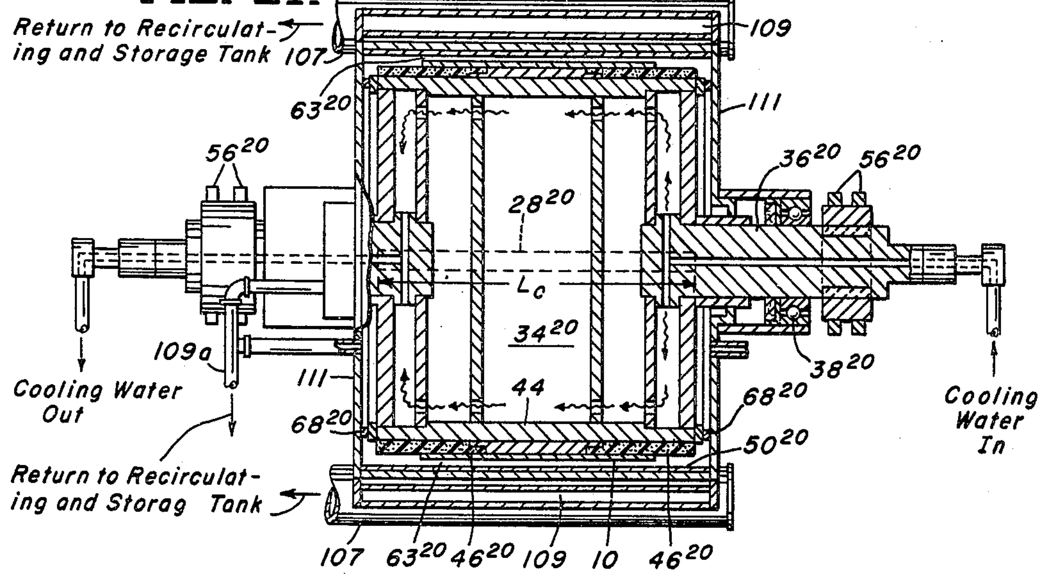
FIGURE 21 is a horizontal sectional view taken along the line XXI—XXI of FIGURE 20 in the direction of the arrows.

By arranging the anode $50^{20}$ (FIGURES 20, 21) approximately 270° radially around a large diameter drum $34^{20}$ (5 feet or larger in diameter) and passing the sheet 10 to be plated around the drum $34^{20}$, an extremely close anode-to-cathode spacing S of about ¼ inch has been made possible. This close spacing S is possible because the sheet tension will hold the sheet 10 taut around the drum $34^{20}$, thus preventing sag or flutter of such sheet 10. Further, the close anode-to-cathode spacing S will reduce the voltage drop across the electrolyte $32^{20}$ thereby reducing the plating power.

In addition, the tank $26^{20}$ is provided with shield means, such as splash shields 94, for containing and redirecting the pressurized flow of electrolyte 32 and damper means, such as a damper 96, for equalizing flow of electrolyte 32 through each side of the tank $26^{20}$ at the various speeds of the sheet 10. The direct current source of supply, such as a D-C generator 98, is provided with a direct current shunt field excitation plating current control 100.

It is practically impossible to maintain good sheet tracking without slack in the sheet 10 around the drum $34^{20}$ when the two rolls $42a^{20}$, $42b^{20}$ exert pressure against the drum $34^{20}$. To prevent slack in the sheet 10 as it passes around the drum $34^{20}$, a small clearance is provided between the exit roll $42b^{20}$ and the drum $34^{20}$. When the direction of the sheet 10 is reversed the above adjustments will be reversed.

The entry roll $42a^{20}$ is biased against the drum $34^{20}$ by pressure means, such as a jack 102 on an air cylinder (not shown) for two reasons: (1) to insure an initial and definite electrical contact between the sheet 10 and the drum $34^{20}$ so that arcing does not occur therebetween, and (2) to control the thickness of the film of electrolyte 32 between the sheet 10 and the drum $34^{20}$.

When plating at high plating current densities (i.e. 500 to 1000 amperes per square foot) and when employing a relative large plating area, copious amounts of electrolyte 32 are required to flow between the anode $50^{20}$ and the cathode (i.e. sheet 10) to provide the necessary metallic ions for plating the sheet 10 and to carry off the oxygen generated in the plating process. Since the anode-to-cathode spacing S is close (approximately ¼ inch) and the flow of electrolyte 32 requirement is large (i.e. approximately 750 g.p.m. for a 5 foot diameter drum $34^{20}$ having 25,000 ampere plating capacity), the electrolyte 32 must be introduced into the electrolyte flow cavity $63^{20}$ under pressure and caused to flow at high velocity through the ¼ inch space S between the anode $50^{20}$ and cathode 10. At the above prescribed flow rate of the electrolyte 32 porosity can be held to about 7% oxygen content and electrolyte conductivity held near the maximum. In order to affect this uniform flow of electrolyte 32 through the cavity $63^{20}$ the electrolyte 32 is pumped by a pump (not shown) from an electrolyte source (not shown) into inlet $28^{20}$ extending substantially the length $L_C$ of the cavity $63^{20}$ at the bottom of the drum $34^{20}$ and such electrolyte 32 is allowed to flow up between the cathode 10 and anode $50^{20}$ around each side of the drum $34^{20}$ and is returned by ducts 109 and 107 to the recirculating and storage tank (not shown).

The drum $34^{20}$ consists of a rubber covered roll approximately 5 feet in diameter and approximately 60 inches or more in body length dependent upon the width of the sheet 10 to be plated. The center of the drum $34^{20}$ contains the conductive surface, such as the cathode contact ring $44^{20}$, which cathode contact ring $44^{20}$ is electrically connected to the drum $34^{20}$. This cathode contact ring $44^{20}$ is approximately 24 inches to 30 inches wide and is constructed of a corrosion-resistant metal, such as Carpenter 20CB3 stainless steel.

Figure 22:
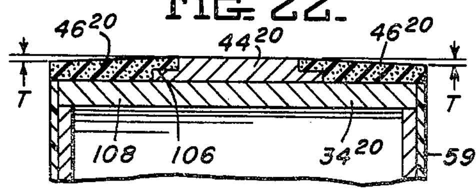
FIGURE 22 is a view similar to FIGURES 8–10 showing a tapered sealing means.

It should be noted that the surface of the cathode contact ring $44^{20}$ is ground smooth and that the rubber surfaces of the resilient sealing strips $46^{20}$ are relatively hard and have been ground with a taper T (FIGURE 22). In sheet tracking at high speed (500 to 1000 f.p.m.) pressures on the edges of the sheet 10 will cause the sheet 10 to mistrack (run off to one side of the drum $34^{20}$). For this reason the rubber surface of the resilent sealing bands $46^{20}$ are tapered on each side of the cathode contact ring $44^{20}$. Experience with pilot models has shown that the underside of the sheet 10 will not plate even on a resilient sealing band $46^{20}$ having a taper T of about .050 inch on radius. The film of electrolyte 32 that exists between the sheet 10 and the resilient sealing bands $46^{20}$ is so thin and its ability to conduct a plating current so low that no plating of the sheet 10 occurs. Examination of steel sheet 10 on production lines passing around a 30-inch diameter resilient sealing bands $46^{20}$ (tapered .050 inch on radius) has demonstrated that the edge of the sheet 10 is always tight against the resilient sealing strip $46^{20}$. A .001-inch thick feeler gage inserted at the point of tangency of the sheet 10 to the resilient sealing band $46^{20}$ could not be withdrawn while the sheet 10 was passing around the drum $34^{20}$.

The relatively hard tough rubber covering on the resilient sealing bands $46^{20}$ (approximately 60 Durometer Shore A Hardness) will provide a practical wearing surface. The stainless steel cathode contact ring $44^{20}$ will also provide a good wearing surface as well as uniformly conducting the plating current into the sheet 10. The cathode contact ring $44^{20}$ of the drum $34^{20}$ is formed by either depositing stainless steel onto the carbon steel body 108 by electric arc welding or by silver soldering a stainless steel shell to the carbon steel body 108. Corrosion is prevented at the joint between the cathode contact ring $44^{20}$ and the resilient sealing bands $46^{20}$ by providing a recessed shoulder 106 (FIGURE 22) at the edge of the cathode contact ring $44^{20}$ and lapping the rubber covering of the resilient sealing bands $46^{20}$ over the shoulder 106.

Since there is as much radial length of conducting surface on the cathode contact ring $44^{20}$ as there is length of the anode $50^{20}$, the transfer current density will be of a low order of about 10 amperes per square inch and no arcing will occur therebetween. The drum $34^{20}$ and shaft $36^{20}$ are constructed of economical low carbon steel and having thicknesses and diameters which maintain current densities in the range of about 70 to 100 amperes per square inch. If the drum $34^{20}$ is constructed of higher conductive materials then a higher current density may be permitted. The drum $34^{20}$ is water cooled to prevent heat buildup.

The ends of the drum $34^{20}$ carry peripheral seals $68^{20}$ which limit flow of the electrolyte 32 up across the ends of the drum $34^{20}$ and out along the shafts $36^{20}$. The small amount of electrolyte 32 which escapes is conveyed by ducts 109*a* to the recirculating sumps and storage tank (not shown).

The tank $26^{20}$ has a steel barrel 113 lined with a 1% silver bearing lead anode $50^{20}$; suitable ribs 110 and plates 112 for supporting the tank $26^{20}$ and for containing the electrolyte $32^{20}$ under pressure and/or distributing the plating current to the anode $50^{20}$; rubber lined or stainless ducts 109 for conveying the electrolyte 32 away from the tank $26^{20}$; and end bells 111 and bearings $38^{20}$ for supporting the drum $34^{20}$.

While in accordance with the patent statutes, preferred and alternative embodiments of the present invention have been illustrated and described in detail, it is to be particularly understood that the invention is not limited thereto or thereby.

I claim:

1. A rotary-type plating apparatus for electroplating a metal onto a moving sheet under tension and having:

(a) tank means adapted to contain an electrolyte,
(b) a rotatable member rotatable in said electrolyte for guiding said sheet along its path of movement through said electrolyte,
(c) a contact member on the periphery of said rotatable member and engageable with said sheet during its path of movement through said electrolyte to make electrical contact therewith,
(d) sealing means adjacent said contact member on said rotatable member for sealing one surface of said sheet from said electrolyte,
(e) anode means in said electrolyte adjacent said rotatable member,
(f) power means connected to said sheet as cathode and to said anode means, and
(g) electrolyte sealing means between said rotatable member and said tank means for confining said electrolyte therebetween,
  (1) said contact member being centrally mounted on said rotatable member,
  (2) said sealing means having resilient sealing bands mounted on said rotatable member adjacent said contact member,
  (3) said contact member and said sealing bands being provided with a tapered surface extending outwardly from the center of said rotatable member to provide positive tracking of said sheet and to minimize the film of electrolyte between said sheet and said sealing bands.

2. A rotary-type plating apparatus for electroplating a metal onto a moving sheet under tension and having:

(a) tank means adapted to contain an electrolyte,
(b) a rotatable member rotatable in said electrolyte for guiding said sheet along its path of movement through said electrolyte,
(c) a contact member on the periphery of said rotatable member and engageable with said sheet during its path of movement through said electrolyte to make electrical contact therewith,
(d) sealing means adjacent said contact member on said rotatable member for sealing one surface of said sheet from said electrolyte,
(e) anode means in said electrolyte adjacent said rotatable member,
(f) power means connected to said sheet as cathode and to said anode means, and
(g) electrolyte sealing means between said rotatable member and said tank means for confining said electrolyte therebetween,
  (1) said contact member and said sealing bands being provided with a recessed shoulder between said contact member and said sealing bands to permit the lap of said sealing bands over said shoulder to eliminate corrosion between said contact member and said sealing bands.

3. A rotary-type plating apparatus for electroplating a metal onto a moving sheet under tension and having:

(a) tank means adapted to contain an electrolyte,
(b) a rotatable drum rotatable in said electrolyte for guiding said sheet along its path of movement through said electrolyte,
(c) a contact member on the periphery of said rotatable drum, extending around said periphery and engageable with said sheet during its path of movement through said electrolyte to make electrical contact therewith,
(d) sealing means adjacent said contact member on said rotatable drum and extending around said periphery for sealing one surface of said sheet from said electrolyte,
(e) anode means in said electrolyte adjacent said rotatable drum,
(f) power means connected to said sheet as cathode and to said anode means,
(g) said rotatable drum, said sheet, said anode means and the surrounding tank means defining an electrolyte containing cavity, and
(h) electrolyte sealing means between said rotatable drum and said tank means for confining said electrolyte in said electrolyte containing cavity.

4. The apparatus recited in claim 3 wherein said electrolyte sealing means for confining said electrolyte between said rotatable drum and said tank means has a disc member on one of said rotatable member and said tank means, a ring member on the other of said rotatable drum and said tank means, and biasing means for said ring member and disc member on one of said tank means and said rotatable drum.

5. The apparatus recited in claim 4 wherein said biasing means is compressed air.

6. The apparatus recited in claim 4 wherein said biasing means is a resilient member.

7. The apparatus recited in claim 4 wherein said biasing means is a resilient member and compressed air.

8. The apparatus recited in claim 3 and having an electrolyte inlet in said tank means communicating with said electrolyte containing cavity, pumping means connected to said electrolyte inlet for introducing electrolyte flow under pressure through said electrolyte containing cavity to reduce oxygen content in said electrolyte and to maximize electrolyte conductivity.

9. The apparatus recited in claim 8 wherein said electrolyte inlet is substantially the width of said cavity.

10. The apparatus recited in claim 8 and having electrolyte collecting means connected to said electrolyte containing cavity for collecting electrolyte.

11. The apparatus recited in claim 10 and having shield means disposed adjacent the terminus of said electrolyte containing cavity above said electrolyte for containing and redirecting the pressurized flow of said electrolyte into said collecting means.

12. The apparatus recited in claim 10 and having damper means disposed adjacent the terminus of said electrolyte containing cavity above said electrolyte for equalizing the flow of said electrolyte through each side of said electrolyte containing cavity.

13. The apparatus recited in claim 3 and having an entrance roll and an exit roll for tracking said sheet onto said rotatable drum, said exit roll defining a small clearance with said rotatable member to prevent slack in said sheet.

14. The apparatus recited in claim 13 wherein pressure means are applied to said entrance roll to insure positive electrical contact between said sheet and said rotatable drum to prevent arcing therebetween, and to minimize the film of said electrolyte therebetween.

15. The apparatus recited in claim 3 wherein said rotatable drum is a rubber coated drum.

16. The apparatus recited in claim 3 wherein said rotatable drum contains means to fluid cool said rotatable member to eliminate heat buildup during the electroplating operation.

17. In a rotary-type plating apparatus for electroplating a metal onto a moving sheet under tension and having tank means adapted to contain an electrolyte, a rotatable drum rotatable in said electrolyte for guiding said sheet extending around its periphery along its path of movement through said electrolyte, anode means in said electrolyte adjacent said rotatable member, said rotatable drum, said sheet, said anode means and the surrounding tank means defining an electrolyte containing cavity, and power means connected to said sheet as cathode and to said anode means, an electrolyte sealing means for confining said electrolyte in said electrolyte containing cavity and having:

(a) a disc member on one of said rotatable drum and said tank means,
(b) a ring member on the other of said rotatable drum and said tank means, and
(c) biasing means for said ring member and disc member on one of said tank means and said rotatable drum.

18. The electrolyte sealing means recited in claim 17 wherein said biasing means is compressed air.

19. The electrolyte sealing means recited in claim 17 wherein said biasing means is a resilient member.

20. The electrolyte sealing means recited in claim 17 wherein said biasing means is a resilient member and compressed air.

21. For a rotary-type plating apparatus for electroplating a metal onto a moving sheet under tension and having tank means adapted to contain an electrolyte, a rotatable member rotatable in said electrolyte for guiding said sheet along its path of movement through said electrolyte, anode means in said electrolyte adjacent said rotatable member, and power means connected to said sheet as cathode and to said anode means, a contact and sealing means having:

(a) a contact member on the periphery of said rotatable member and engageable with said sheet during its path of movement through said electrolyte to make electrical contact therewith,
(b) sealing means adjacent said contact member on said rotatable member for sealing one surface of said sheet from said electrolyte,
(c) said contact member being centrally mounted on said rotatable member,
(d) said sealing means having resilient sealing bands mounted on said rotatable member adjacent said contact member,
(e) said contact member and said sealing bands being provided with a tapered surface extending outwardly from the center of said rotatable member to provide positive tracking of said sheet and to minimize the film of electrolyte between said sheet and said sealing bands.

22. The apparatus recited in claim 21 wherein a recessed shoulder is provided between said contact member and said sealing bands to permit the lap of said sealing bands over said shoulder to eliminate corrosion between said contact member and said sealing bands.

References Cited

UNITED STATES PATENTS

| | | | |
|---|---|---|---|
| 2,271,735 | 2/1942 | Hall | 204—206 |
| 1,993,726 | 3/1935 | Wilkins | 204—281 |
| 2,244,423 | 6/1941 | Hall | 204—209 |
| 2,271,736 | 2/1942 | Hall | 204—206 |
| 2,477,808 | 8/1949 | Jones | 204—211 |
| 2,844,529 | 7/1958 | Cybriwsky et al. | 204—28 |
| 3,270,401 | 9/1966 | Staley et al. | 204—28 |
| 3,362,893 | 1/1968 | Amaro et al. | 204—211 |

JOHN H. MACK, Primary Examiner

T. TUFARIELLO, Assistant Examiner

U.S. Cl. X.R.

204—28, 224, 237